United States Patent [19]

Rowe et al.

[11] Patent Number: 4,831,303
[45] Date of Patent: May 16, 1989

[54] COIL ARMOR TAPE FOR NEW BONDING SURFACE AND CORONOX SEAL

[75] Inventors: Charles M. Rowe, Orlando; Robert T. Ward, Winter Park, both of Fla.

[73] Assignee: Westinghouse Electric Corp., Pittsburgh, Pa.

[21] Appl. No.: 149,239

[22] Filed: Jan. 27, 1988

[51] Int. Cl.⁴ .......................... H02K 3/50; H02K 3/40
[52] U.S. Cl. ..................................... 310/260; 310/45; 310/196
[58] Field of Search .............. 174/127, 138 E; 29/596; 310/43, 45, 194, 196, 208, 260, 197; 428/415, 417

[56] References Cited

U.S. PATENT DOCUMENTS

| 2,677,067 | 4/1954 | Johnson et al. | 310/260 |
| 2,994,735 | 8/1961 | Marshall et al. | 174/138 E |
| 3,454,805 | 7/1969 | Fromm et al. | 310/270 |
| 3,508,096 | 4/1970 | Kull et al. | 310/196 |
| 3,823,334 | 7/1974 | Philofsky | 310/196 |
| 3,942,057 | 3/1976 | Philofsky et al. | 310/260 |
| 3,991,334 | 11/1976 | Cooper et al. | 310/260 |
| 4,140,640 | 2/1979 | Scherubel | 166/307 |
| 4,388,546 | 6/1983 | Schwanzer | 310/196 |
| 4,403,163 | 9/1983 | Armerding et al. | 310/196 |
| 4,618,795 | 10/1986 | Cooper et al. | 310/260 |
| 4,735,833 | 4/1988 | Chiotis et al. | 428/417 |

FOREIGN PATENT DOCUMENTS 56-83238  7/1981  Japan ................................. 310/196

Primary Examiner—Peter S. Wong
Assistant Examiner—D. L. Rebsch

[57] ABSTRACT

Improved turbine generators including stator coil bracing and methods for bonding stator coils to diamond spacers to reduce the leakage of Corona suppressive compositions, such as CORONOX ®, are provided. The apparatus and methods include wrapping a portion of the stator coils coated with the Corona suppressive compositions with a reinforced layer which has been impregnated with a room-temperature polermizing resin. The preferred constructions increase the bond strength between the coils and diamond spacers to provide a more homogeneous stator unit.

8 Claims, 2 Drawing Sheets

COIL ARMOR TAPE FOR NEW BONDING SURFACE AND CORONOX SEAL

FIELD OF THE INVENTION

This invention relates to improvements to the stator end windings of turbine generators for electric power, and particularly to means for minimizing leaching of semi-conductive compounds from the stator winding to bracing component interfaces and to provide a superior bonding surface for bracing components.

BACKGROUND OF THE INVENTION

The stator end windings of many of today's turbine generators are generally insulated with a semi-conductive compound, such as CORONOX ® which comprises silicon carbide and varnish. Selected surfaces of stator coils are typically painted with CORONOX ® to suppress Corona activity, the art recognized term for electrical discharge from the sides of the coils associated with high voltage gradients. A CORONOX ® protected winding exhibits a surface which is chalk-like, and generally deficient in mechanical and bonding properties. Moreover, leaching of this compound due to component motion and oil can contribute to poor bracing within the winding.

In the late 1960's and early 1970's, the CORONOX ® layer was protected by a layer of MYLAR ® and glass tape which provided only nominal physical properties.

In the late 1970's, layers of SCOTCHPLY ® were applied successfully to the larger inner-cooled coils of the abovementioned generators. These layers were applied in a semi-cured state which was often characterized as being tacky to the touch. After wrapping the stator coils with this material, the assembly was heated to about 150° C. for about 10 to 20 hours. The curing temperatures used for this procedure presented a constant threat of distorting copper coils, especially those currently in service. In addition, SCOTCHPLY ® increased the scuff and wear resistance of the coils, yet, resulted in a slippery surface which did not bond sufficiently to other components, such as the "diamond spacers" used to separate the individual coils of the stator. Thus, a sanding procedure was instituted to prepare these surfaces to effect a good bond.

Accordingly, a need exists for an improved stator coil bracing assembly, especially for older in-service windings not protected with SCOTCHPLY ® which is resistant to CORONOX ® leaching. There is also a need for a sealing technique that permits better bonding between the stator coils and diamond spacers, without heating the stator coils to 150° C.

SUMMARY OF THE INVENTION

This invention provides novel improvements to turbine generators and methods for sealing stator coils to provide improved bonding between the coils and diamond spacers so that the Corona-suppessive, semiconducting compounds, such as CORONOX ® are prevented from leaching out in service. To achieve these objectives, the portion of the stator coil coated with the Corona-suppressive composition is wrapped with a reinforced and uncured reinforced layer which has been impregnated with a resinous material. The successive "wrapped" coils are then separated with diamond spacers which bond together with the coils as the resinous material cures at room temperature to form a substantially homogeneous bracing. As used herein, the term "room temperature" refers to ambient or atmospheric temperature. The invention seals the preferred CORONOX ® and/or similar compositions from leaching out from the interface between the diamond spacers and coils due to the relative motion between the components.

Accordingly, an improved turbine generator and method for bonding and sealing stator coils is provided. The invention substantially eliminates the problems associated with bonding the coils to the diamond spacers.

In the preferred embodiments, the resinous material and reinforced layers are applied to the coils and diamond spacers in an unpolymerized state, so that all the components cure together in homogeneous fashion. Since the selected resinous materials are curable at ambient temperature, there is no adverse effect on the copper coils of the stators. The methods employed by this invention, produce a closer fit between the components and eliminate costly manual sanding steps.

In the more preferred embodiments of this invention, a specially devised tape, preferably made of glass-filled polyester, is impregnated with a filled polymerizing resin and then wrapped around the portion of the coils coated with Corona-suppressive compositions. Alternatively, a piece of fibrous material, such as polyester felt, can be wrapped around the diamond spacers to effect a more accommodating bond when inserted between coils. The polymerizing resins of this invention aid in the attachment of the diamond spacer to the stator coil assembly, so as to form a substantially homogeneous construction for maximizing bracing strength.

It is, therefore, an object of this invention to prevent the leaching of the Corona suppressing compositions from the diamond spacer-coil interfaces.

It is another object of this invention to provide a more homogeneous bracing for the stator coils.

It is still another object of this invention to provide a method for assembling stator components so as to prevent a loosening of its parts.

With these and other objects in view, which will become apparent to one skilled in the art as the description proceeds, this invention resides in the novel construction, combination, arrangement of parts and methods substantially as hereinafter described, and more particularly defined by the attached claims.

BRIEF DESCRIPTION OF THE DRAWINGS

The accompanying drawings illustrate a complete embodiment of the invention according to the best mode so far devised for the practical application of the principles thereof, and in which.

DETAILED DESCRIPTION OF THE INVENTION

Disclosed herein are methods and apparatus which address the problems associated with CORONOX ® leaching from turbine generators, and in particular, from the stator winding assembly. The invention includes applying a reinforced layer around the portion of the stator coils coated with a semi-conducting composition, preferably CORONOX ®. The reinforced layer is impregnated with a room temperature curing, polymerizing resin, which preferably cures in contact with diamond spacers disposed between adjoining stator coils.

Figure 1:
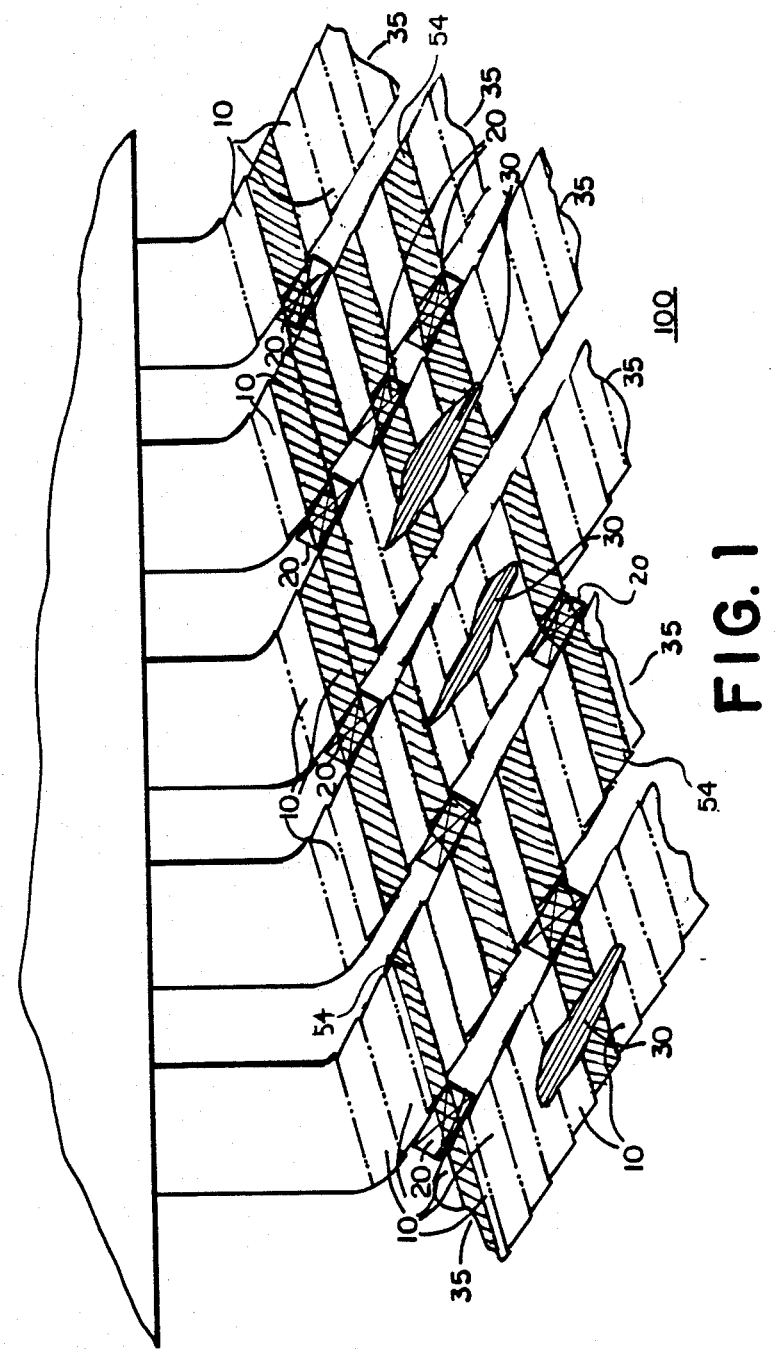
FIG. 1: is a partial perspective view of a preferred stator assembly for a turbine generator winding, illustrating a plurality of stator coils separated by diamond spacers and further illustrated by cut-away portions revealing coils coated with a Corona-suppressive composition.

Referring now to FIG. 1, a portion of a stator 100 is illustrated. The stator 100 includes coils 35 disposed in parallel along their longitudinal sides. The coils 35 comprise portions 30 coated with a Corona-suppressive composition. The coils 35 further can be cooled by several known methods; such methods include external cooling, and inner cooling, with air, gas or liquid. The coils 35 are preferably spaced apart with diamond spacers 20. The spacers 20, in turn, can be installed with a conformable layer to insure good fit and tightness.

Figure 2:
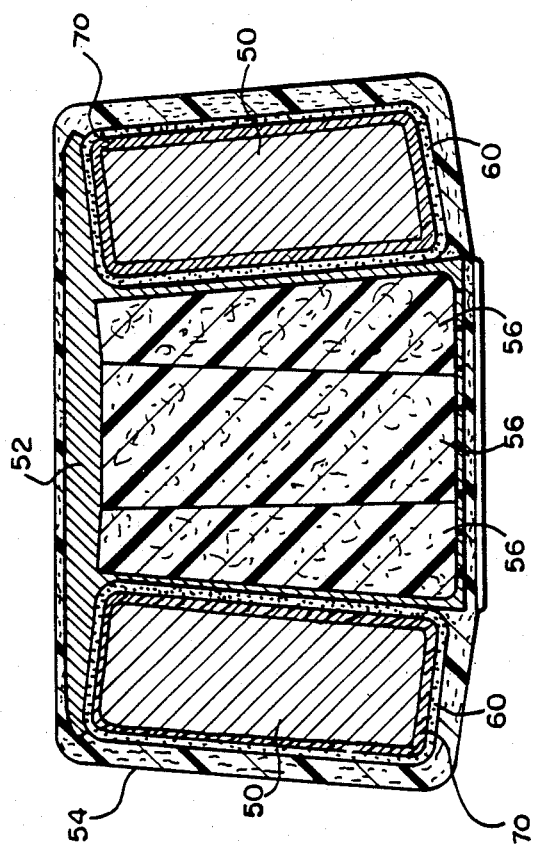
FIG. 2: is a cross-sectional view of a preferred, fully-assembled, three-piece diamond spacer arrangement disposed between adjacent coils.

Referring now to FIG. 2, a cross-section of a preferred stator coil banding assembly illustrating a preferred diamond spacer 56 having three sections and wedged between two adjacent coils 50. In this most preferred embodiment, the coils 50 have a portion 70 coated with a Corona-suppressive composition, such as CORONOX ®. This composition preferably comprises a ceramic and a resinous solution. A most preferred composition includes silicon carbide, and varnish.

The invention further includes a reinforced layer 60 disposed around the coated portion 70 of the stator coil 50 and impregnated with a polymerizing resin. This reinforced layer 60 preferably comprises a sheet of material, preferably polymeric, having polyester fiber and/or fiberglass, but also may include whiskers of other reinforcing materials. In a most preferred embodiment, the reinforced polymeric layer 60 comprises a glass-filled polyester tape made of 70% glass filling yarns or picks and 30% polyester end yarns. The tape generally can have a thickness of about 1.5 mm to 2.5 mm, preferably 2.0 mm. As described substantially in FIG. 1, this tape can be disposed over the coils 35 in a lapped, preferably half-lapped, application 10 to further avoid leaching of the Corona-suppressive compounds.

The polymerizing resin of this invention should have sufficient sealing and hardening capabilities for providing a good bond between the coils 35 or 50 and diamond spacers 20 or 56. It should be capable of polymerizing at room temperatures without additional heat, i.e., light and air polymerizing resins. A two-part polymerizing plastic is preferred, i.e., a thermosetting polymer having resin and hardener components, and it is expected that epoxy resins would be ideally suited to the task. As used herein, the term epoxy resins refers to the polyether resin class of polymers having high strength and low shrinkage during curing. It is expected that a fibrous material 52, such as polyester felt, could be employed to further reinforce the sealing capabilities of this polymerizing resin. In a most preferred embodiment, the polyester-glass tape is impregnated with a filled epoxy resin, such as silica filled resin, and then wrapped around the stator coils 50.

In the preferred method of this invention, the tape and resin are applied to the coils 50 as an unpolymerized composition. The diamond spacers 56 are then wrapped in resin impregnated felt and inserted between the prepared moist coils 50. Finally, a polyester-glass banding 54 is applied around two or more prepared coils 50. The reinforced layer 60, diamond spacers 56 and felt 52 are then cured together to form a homogeneous bracing. According to this design, the reinforced bracing provides two sheaths of material which must move as a single unit in order to loosen. Also, the resulting construction controls the leaching of the semi-conducting compounds used to coat the coils 50.

From the foregoing, it can be realized that this invention provides improved methods and materials for minimizing the loss of Corona-suppressive coatings on stator coils and for improving the bond between stator winding bracing components. Although various embodiments have been illustrated, this was for the purpose of describing, but not limiting, the invention. Various modifications, which will become apparent to one skilled in the art, are within the scope of this invention described in the attached claims.

We claim that:

1. In a turbine generator of the type having a stator coil disposed within a winding, said coil having a portion thereof coated with a Corona suppressive composition and disposed next to a spacer in said winding, the improvement comprising:
   a reinforced layer disposed around at least a part of said coated portion of said stator coil and impregnated with a room temperature polymerizing resin, said reinforced layer and polymerizing resin cured to form a bond between said spacer and said coil.

2. The turbine generator of claim 1 wherein said Corona suppressive composition comprises a ceramic and a resinous solution.

3. The turbine generator of claim 1 wherein said Corona suppressive composition comprises silicon carbide and varnish.

4. The turbine generator of claim 1 wherein said reinforced layer comprises polyester fiber.

5. The turbine generator of claim 3 wherein said reinforced layer comprises polyester tape having a thickness of about 1.5 mm to about 2.5 mm.

6. The turbine generator of claim 3 wherein said reinforced layer comprises a polyester tape having a thickness of about 2.0 mm.

7. The turbine generator of claim 5 wherein said polyester tape comprises fiberglass.

8. A steam turbine generator of the type having a stator winding having a portion thereof coated with an Corona suppressive composition and disposed next to a spacer, the improvement comprising:
   a lapped layer of glass-filled, polyester tape disposed around said coated portion of said stator winding and impregnated with a filled epoxy resin curable at room temperatures.

* * * * *